United States Patent
Reial et al.

(10) Patent No.: US 12,150,063 B2
(45) Date of Patent: Nov. 19, 2024

(54) WIRELESS COMMUNICATION DEVICE, METHOD AND COMPUTER PROGRAM FOR SELECTION OF AN ENERGY EFFICIENT CONTROL INFORMATION RECEPTION MODE

(71) Applicant: Telefonaktiebolaget LM Ericsson (publ), Stockholm (SE)

(72) Inventors: Andres Reial, Lomma (SE); Johan Nilsson, Höllviken (SE); Gang Zou, Lund (SE); Sina Maleki, Malmö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 546 days.

(21) Appl. No.: 17/291,538

(22) PCT Filed: Oct. 29, 2019

(86) PCT No.: PCT/EP2019/079554
§ 371 (c)(1),
(2) Date: May 5, 2021

(87) PCT Pub. No.: WO2020/094468
PCT Pub. Date: May 14, 2020

(65) Prior Publication Data
US 2022/0007295 A1 Jan. 6, 2022

Related U.S. Application Data

(60) Provisional application No. 62/755,867, filed on Nov. 5, 2018.

(51) Int. Cl.
H04W 52/02 (2009.01)
H04W 28/20 (2009.01)
(Continued)

(52) U.S. Cl.
CPC ....... *H04W 52/0258* (2013.01); *H04W 28/20* (2013.01); *H04W 52/0225* (2013.01);
(Continued)

(58) Field of Classification Search
None
See application file for complete search history.

(56) References Cited

U.S. PATENT DOCUMENTS

2010/0265851 A1* 10/2010 Shahar ................ H04W 84/042
370/278
2012/0026039 A1* 2/2012 Ganeshan ............... G01S 19/37
342/357.73
(Continued)

FOREIGN PATENT DOCUMENTS

WO 2018085145 A8 5/2018

OTHER PUBLICATIONS

International Search Report and Written Opinion dated Jan. 8, 2020 for International Application No. PCT/EP2019/079554 filed Oct. 29, 2019, consisting of 9-pages.
(Continued)

*Primary Examiner* — San Htun
(74) *Attorney, Agent, or Firm* — Weisberg I.P. Law, P.A.

(57) ABSTRACT

There is provided a method of a wireless communication device, the communication device being arranged to operate in a wireless communication system employing a plurality of bandwidth alternatives for downlink control information. The method includes determining feasible control information reception modes, acquiring an estimate of energy consumption for respective feasible control information reception modes, selecting control information reception mode based on the estimated energy consumption, and operating the wireless communication device with the selected control information reception mode. A wireless communication
(Continued)

device and a computer program for implementing the method in the wireless communication device are also provided.

33 Claims, 3 Drawing Sheets

(51) Int. Cl.
    *H04W 72/1268*     (2023.01)
    *H04W 72/1273*     (2023.01)
    *H04W 72/20*     (2023.01)
    *H04W 88/06*     (2009.01)

(52) U.S. Cl.
    CPC ... *H04W 72/1268* (2013.01); *H04W 72/1273* (2013.01); *H04W 72/20* (2023.01); *H04W 88/06* (2013.01)

(56) References Cited

U.S. PATENT DOCUMENTS

| | | | | |
|---|---|---|---|---|
| 2012/0120858 | A1* | 5/2012 | Das | H04W 52/0229 370/311 |
| 2013/0159478 | A1 | 6/2013 | Rousu et al. | |
| 2013/0194995 | A1* | 8/2013 | Reinhardt | H04W 52/0258 370/311 |
| 2015/0334653 | A1* | 11/2015 | Ang | H04W 52/0212 370/311 |
| 2018/0014251 | A1* | 1/2018 | Sambhwani | H04W 52/0212 |
| 2018/0092039 | A1* | 3/2018 | Cariou | H04W 52/34 |
| 2018/0124784 | A1* | 5/2018 | Kumar | H04W 52/0206 |
| 2018/0220257 | A1* | 8/2018 | Bhattad | H04W 4/70 |
| 2018/0332655 | A1* | 11/2018 | Ang | H04W 52/0216 |

OTHER PUBLICATIONS

3GPP TSG-RAN WG1 Meeting #93 R1-1807005; Title: Enhancements for NR UE Power Saving (updated version of RP-1804773); Agenda Item: 7.1.3.6; Source: Apple Inc.; Document for: Discussion, Decision; Date and Location: May 21-25, 2018, Busan, Korea, consisting of 7-pages.

European Search Report and Communication dated Jul. 20, 2023 for Application No. 19 797 643.4, consisting of 4-pages.

* cited by examiner

WIRELESS COMMUNICATION DEVICE, METHOD AND COMPUTER PROGRAM FOR SELECTION OF AN ENERGY EFFICIENT CONTROL INFORMATION RECEPTION MODE

CROSS-REFERENCE TO RELATED APPLICATIONS

This application is a Submission Under 35 U.S.C. § 371 for U.S. National Stage Patent Application of International Application No.: PCT/EP2019/079554, filed Oct. 29, 2019 entitled "WIRELESS COMMUNICATION DEVICE, METHOD AND COMPUTER PROGRAM FOR SELECTION OF AN ENERGY EFFICIENT CONTROL INFORMATION RECEPTION MODE," which claims priority to U. S. Provisional Application No.: 62/755,867, filed Nov. 5, 2018, the entireties of both of which are incorporated herein by reference.

TECHNICAL FIELD

The present disclosure generally relates to a wireless communication device being arranged to operate in a wireless communication system employing a plurality of bandwidth alternatives for downlink control information, a method therefor, and a computer program. In particular, the present disclosure relates to an approach for selecting an energy efficient control information reception mode.

BACKGROUND

In a $3^{rd}$ Generation Partnership Project, 3GPP, Long Term Evolution, LTE, or New Radio, NR, communication system, wireless communication devices, often referred to as User Equipment, UE, main activity in mode where connected according to radio resource control, RRC_CONNECTED mode, is to monitor physical downlink control channel, PDCCH, for a scheduled physical downlink shared channel, PDSCH. The UE needs to decode all PDCCH occasions, Time/frequency, T/F, locations, and blind decoding, BD, configurations according to a configured search space. The UE operates at a reception bandwidth, RX BW, setting that covers the configured PDCCH search space(s). After PDCCH decoding on each BD option, the UE can check whether the PDCCH is targeted to it by checking the cyclic redundancy check, CRC, using its cell radio network temporary identifier, C-RNTI. If a scheduled PDSCH is indicated, the UE will prepare or PDSCH reception, including possibly changing the bandwidth, BW, configuration if the PDSCH BW or sub-band location is not contained in the synchronisation signal, SS, sub-band.

During the time between PDCCH monitoring occasions, if no PDSCH is granted, the UE can move to a micro-sleep state where the radio frequency, RF, circuitry is deactivated or operating at a standby mode. Starting with LTE, a connected mode discontinuous reception, C-DRX, mechanism have been introduced so that a UE can go into a low-power mode for a considerably larger fraction of the time when no data traffic will be directed to the UE.

In addition to C-DRX, NR introduces a bandwidth part, BWP, concept to enable the UE to adaptively adjust its operating bandwidth, including and accommodating integrated handling of relevant signals. The BWP mechanism can be applied as a UE power saving tool. For example, by switching BWP, it is possible for a UE to monitor PDCCH in narrow BW and switch to wider BW for PDSCH reception.

The NR specifications support much wider maximum channel BW than LTE. An assumption is that the maximum bandwidth will be supported by UEs. Since UEs are not always demanding high data rates, using wide BW all the time results in higher than necessary UE power consumption, both from RF reception/transmission and baseband signal processing. The BWP concept provides an opportunity to operate UEs with smaller BW than the configured channel BW.

RX BW switching, e.g. by reconfiguring between different BWPs or monitoring larger or smaller parts of the same BWP, is considered a useful feature for UE power savings. However, the switching operation is not free from additional energy consumption or other issues—it imposes at least a time cost, for example, RF hardware, HW, reconfiguration is not instantaneous, and an energy cost, for example RF reconfiguration implies enabling/disabling HW blocks which causes non-negligible energy consumption during the transient.

Traditionally, a decision whether to switch to a lower-BW mode for a limited duration may consider the latency aspect of switching—whether the duration of the transient stage would limit reception of required signals according to predetermined timing patterns. However, some important aspects like the energy cost of configuration switching and additional ways to reduce the transition latency itself are traditionally not considered.

There is a need for an improved mechanism for UE RX BW switching during PDCCH monitoring, that allows the choice of receiver BW settings at different time points to be more suitable to present circumstances, so that the total UE energy consumption is reduced, and additional latency constraints are avoided.

The above information disclosed in this Background section is only for enhancement of understanding of the background of the disclosure and therefore it may contain information that does not form the prior art that is already known to a person of ordinary skill in the art.

SUMMARY

The approaches of this disclosure are based on the inventors' understanding that energy is saved most effectively when a UE can determine whether, and in which sub-mode, to switch to some lower-BW operation, considering the energy savings potential in the lower-BW mode, taking into account the expected duration to remain in the low-BW mode, the energy cost of back and forth mode switching, and the latency (minimum delay) of returning to the high-BW mode, and that energy saving is not guaranteed by applying any power saving approach at any time.

Aspects of the disclosed invention are defined by the independent claims, and embodiments thereof are define by the dependent claims.

According to a first further aspect, there is provided a method of a wireless communication device, the communication device being arranged to operate in a wireless communication system employing a plurality of bandwidth alternatives for downlink control information. The method comprises determining feasible control information reception modes, acquiring an estimate of energy consumption for respective feasible control information reception modes, selecting control information reception mode based on the estimated energy consumption, and operating the wireless communication device with the selected control information reception mode.

The method may comprise determining control information reception parameters among a set of candidate control information reception mode parameters, which parameters comprises one or more of bandwidth of current control information reception mode, expected required bandwidth of feasible data information reception modes, duration of feasible data information reception modes, transition latency requirements from a current control or data information reception mode to feasible candidate control information reception modes, actual transition latencies associated with transition from candidate control information reception modes to feasible data information reception modes, and transition latency requirements from candidate control information reception modes to feasible data information reception modes.

The method may comprise acquiring a latency requirement estimate for a transition from a current control or data information reception mode to respective candidate control information reception modes, wherein the selecting of control information reception mode is further based on the latency requirement estimate for the transition from the current control or data information reception mode to the respective candidate control information reception modes. The acquiring of the latency requirement estimate for the transition from the current control or data information reception mode to the respective candidate control information reception modes may comprise any of estimating the latency from historical data of the wireless communication device, calculating an estimate based on parameters of the respective control information reception mode, and accessing a stored estimate.

The method may comprise acquiring latency requirement estimates for a transition from each candidate control information reception modes to a scheduled data information reception mode, wherein the selecting of control information reception mode is further based on the latency requirement estimates for the transition from each candidate control information reception modes to the scheduled data information reception mode. The acquiring of the latency requirement estimates for the transition from each candidate control information reception modes to a scheduled data information reception mode may comprise any of estimating the latency from historical data of the wireless communication device, calculating an estimate based on parameters of the respective control information reception mode, and accessing a stored estimate.

The determining of feasible control information reception modes may take the latency estimates for each candidate mode into account.

The acquiring of the estimate of energy consumption for respective control information reception mode may comprise any of estimating the energy consumption from historical data of the wireless communication device, calculating an estimate based on parameters of the respective control information reception mode, and accessing a stored estimate. The calculating of the estimate based on parameters of the respective control information reception mode may comprise an aggregate of one or more of calculating analog radio frequency circuitry energy consumption for applied bandwidth, calculating analog-to-digital conversion circuitry energy consumption for applied conversion rate, calculating energy consumption for switching of bandwidth of analog radio frequency circuitry, calculating baseband processing energy consumption for the control information reception mode.

The feasible control information reception modes may comprise the current control information reception mode.

At least one of the feasible control information reception modes may comprise operating analog receiver radio circuitry at a reduced bandwidth compared with data information reception modes to fit control information transmissions.

At at least one of the feasible control information reception modes may comprise operating analog receiver radio circuitry at a bandwidth wider than to fit control information transmissions but where analog-to-digital conversion is performed at a lower rate than corresponding to the bandwidth on which the analog radio receiver circuitry is operated. The control information reception mode which comprises operating analog receiver radio circuitry at a bandwidth wider than to fit control information transmissions but where analog-to-digital conversion is performed at a lower rate than corresponding to the bandwidth on which the analog radio receiver circuitry is operated may comprise determining analog-to-digital conversion sampling rate based on a bandwidth of a control information transmission, and applying a baseband processing window adapted to a bandwidth of the control information transmissions. The method may comprise selecting the analog-to-digital conversion sampling rate $f_s$ to be chosen at least equal to or higher than the bandwidth of the control information transmission so that a folding results in the control information transmission signal being copied close to zero frequency f=0 with low folding distortion. The analog-to-digital conversion sampling rate $f_s$ may be a multiple m of a subcarrier spacing $f_{sc}$ of an orthogonal frequency division multiplex, OFDM, signal of the control information transmission signal, $f_s=m \cdot f_{sc}$. Alternatively, the resulting signal of the folding may be resampled to allow direct extraction of orthogonal frequency division multiplex, OFDM, subcarriers carrying the control information transmission signal.

The method may comprise receiving signalling indicating bandwidth of control information transmission and that active radio frequency bandwidth is known to be empty outside the bandwidth of the control information transmission. The method may alternatively comprise estimating bandwidth of information transmission, and whether active radio frequency bandwidth is empty outside the bandwidth of the information transmission, i.e. outside a frequency interval adjacent to the information transmission that corresponds to a fundamental frequency period.

According to a second further aspect, there is provided a wireless communication device being arranged to operate in a wireless communication system employing a plurality of bandwidth alternatives for downlink control information. The wireless communication device comprises transceiver and processing circuitry configured to determine feasible control information reception modes, acquire an estimate of energy consumption for respective feasible control information reception modes, select control information reception mode based on the estimated energy consumption, and operate the wireless communication device with the selected control information reception mode.

The circuitry may be configured to determine control information reception parameters among a set of candidate control information reception mode parameters, which parameters may comprise one or more of bandwidth of current control information reception mode, expected required bandwidth of feasible control information reception modes, duration of feasible data information reception modes, actual transition latencies associated with transition from a current control or data information reception mode to feasible candidate control information reception modes, and transition latency requirements from candidate control information reception modes to feasible data information reception modes.

The circuitry may be configured to acquire a latency requirement estimate for a transition from a current control or data information reception mode to respective candidate control information reception modes, wherein the selection of control information reception mode may further be based on the latency requirement estimate for the transition from the current control or data information reception mode to the respective candidate control information reception modes. The acquisition of the latency requirement estimate for the transition from the current control or data information reception mode to the respective candidate control information reception modes may comprise any of the circuitry being arranged to estimate the latency from historical data of the wireless communication device, to calculate an estimate based on parameters of the respective control information reception mode, and to access a stored estimate.

The circuitry may be arranged to acquire latency requirement estimates for a transition from each candidate control information reception modes to a scheduled data information reception mode, wherein the selection of control information reception mode may further be based on the latency requirement estimates for the transition from each candidate control information reception modes to the scheduled data information reception mode. The acquisition of the latency requirement estimates for the transition from each candidate control information reception modes to a scheduled data information reception mode may be performed by the circuitry is arranged to estimate the latency from historical data of the wireless communication device, calculate an estimate based on parameters of the respective control information reception mode, access a stored estimate, or any combination thereof. The determination of feasible control information reception modes may take the latency estimates for each candidate mode into account.

The acquired estimate of energy consumption for respective control information reception mode may comprise any of an estimate of the energy consumption from historical data of the wireless communication device, a calculation of an estimate based on parameters of the respective control information reception mode, and a stored estimate. The calculation of the estimate based on parameters of the respective control information reception mode may comprise an aggregate of one or more of a calculation of analog radio frequency circuitry energy consumption for applied bandwidth, a calculation of analog-to-digital conversion circuitry energy consumption for applied conversion rate, a calculation of energy consumption for switching of bandwidth of analog radio frequency circuitry, a calculation of baseband processing energy consumption for the control information reception mode.

The feasible control information reception modes may comprise the current control information reception mode.

At least one of the feasible control information reception modes may include to operate analog receiver radio circuitry at a reduced bandwidth compared with data information reception modes to fit control information transmissions.

At least one of the feasible control information reception modes may include to operate analog receiver radio circuitry at a bandwidth wider than to fit control information transmissions but where analog-to-digital conversion is performed at a lower rate than corresponding to the bandwidth on which the analog radio receiver circuitry is operated. The control information reception mode which includes to operate analog receiver radio circuitry at a bandwidth wider than to fit control information transmissions but where analog-to-digital conversion is performed at a lower rate than corresponding to the bandwidth on which the analog radio receiver circuitry is operated may include to determine analog-to-digital conversion sampling rate based on a bandwidth of a control information transmission, and apply a baseband processing window adapted to a bandwidth of the control information transmissions.

The circuitry may be arranged to receive signalling indicating bandwidth of control information transmission and that active radio frequency bandwidth is known to be empty outside the bandwidth of the control information transmission. Alternatively, the circuitry may be arranged to estimate bandwidth of control information transmission, and whether active radio frequency bandwidth is empty outside the bandwidth of the control information transmission.

According to a third further aspect, there is provided a computer program comprising instructions which, when executed on a processor of a wireless communication device, causes the wireless communication device to perform the method according to the first aspect.

BRIEF DESCRIPTION OF THE DRAWINGS

The above, as well as additional objects, features and advantages of the present disclosure, will be better understood through the following illustrative and non-limiting detailed description of preferred embodiments of the present disclosure, with reference to the appended drawings.

DETAILED DESCRIPTION

Compared to always applying conservative criteria for low-power operation, power is actually more effectively saved when a UE is capable of determining whether, and in which sub-mode, to switch to some lower-BW operation, considering the energy savings potential in the lower-BW mode, taking into account the expected duration to remain in the low-BW mode, the energy cost of back and forth mode switching, and the latency (minimum delay) of returning to the high-BW mode, and the UE is capable of operating according to the determination.

At least two main approaches for modes for lower-BW operation may be distinguished—(1) narrower RF BW including selectivity filtering and (2) maintaining a wider BW but performing lower-rate ADC according to e.g. bandpass-sampling principles.

The network, NW, can help the UE in robust RX BW switching mode selection by configuring the UE with info about the expected range of the time offset between the scheduling PDCCH and the PDSCH, often referred to as the K0 value. The UE uses this knowledge to conclude whether or not the BW switching delay may exceed the offset.

Figure 1:
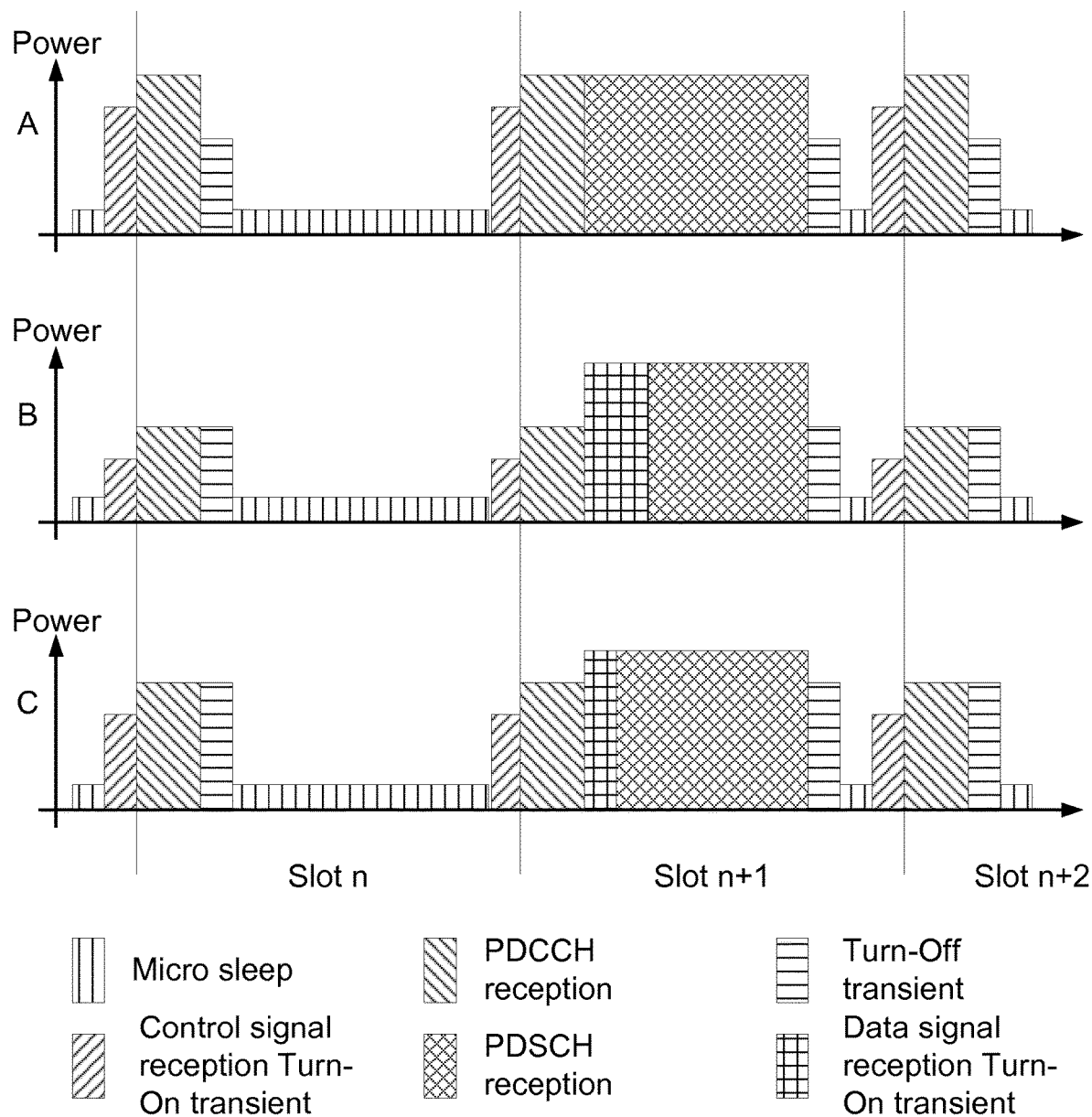
FIG. 1 schematically illustrates power consumption diagrams for different scenarios, A, B and C, of reception of control and possible data information.

FIG. 1 schematically illustrates power consumption diagrams for different scenarios, A, B and C, of reception of control and possible data information. To demonstrate the approach of the disclosure, the example UE power states are shown during PDCCH monitoring and PDSCH reception in some operational modes. The shown sequence of power states is just one of multiple possible ones, and the power levels shown are only examples and not to scale or even in size order. The actual power consumption levels in the different states depend on the given UE hardware and software design.

Pattern A of FIG. 1 shows a conventional UE implementation where the UE uses a full-bandwidth RX for both PDCCH and PDSCH. No constraints are imposed on PDCCH-PDSCH timing, at the expense of PDCCH monitoring energy consumption, which may be incur a relatively high energy penalty compared to what would be achievable if most PDCCH occasions do not schedule a PDSCH.

Pattern B of FIG. 1 shows a setup with a reduced-power PDCCH monitoring mode, e.g. reducing the RF BW to what is required for the PDCCH search space, i.e. RF BW is adapted to fit the control information transmission. The PDCCH monitoring energy impact is significantly reduced, but due to the potentially large turn-on transient time, which is square tiling marked in figure, required to activate the PDSCH RX mode, the PDCCH reduction is only possible if the PDCCH to PDSCH scheduling delay is sufficiently long, e.g. K0>0. For same-slot scheduling, this approach will typically not work if the turn-on transient time for the PDSCH reception configuration exceeds a small fraction of an orthogonal frequency division multiplexing, OFDM, symbol length. In that case, the scheduling pattern B is not feasible, and the baseline pattern A of FIG. 1 is an option to be used instead.

Pattern C of FIG. 1 depicts a setup with an alternative reduced-power PDCCH receiver that may provide a different power/latency trade-off. One such receiver could be a bandpass-sampling receiver, which will be further discussed below. In that example, the transition time from PDCCH mode to PDSCH mode may be short enough to allow immediate PDSCH reception upon detecting a scheduled data indication. While the power reduction in PDCCH may be lower, the ability to activate the low-power mode without constraints on the PDSCH scheduling delay may lead to higher practical accumulated energy savings since the low-power mode may be used more often.

These simplified diagrams thus illustrate that more elaborate power mode selection by the UE can provide energy efficiency advantages and/or avoid performance loss in a variety of scenarios.

Figure 2:
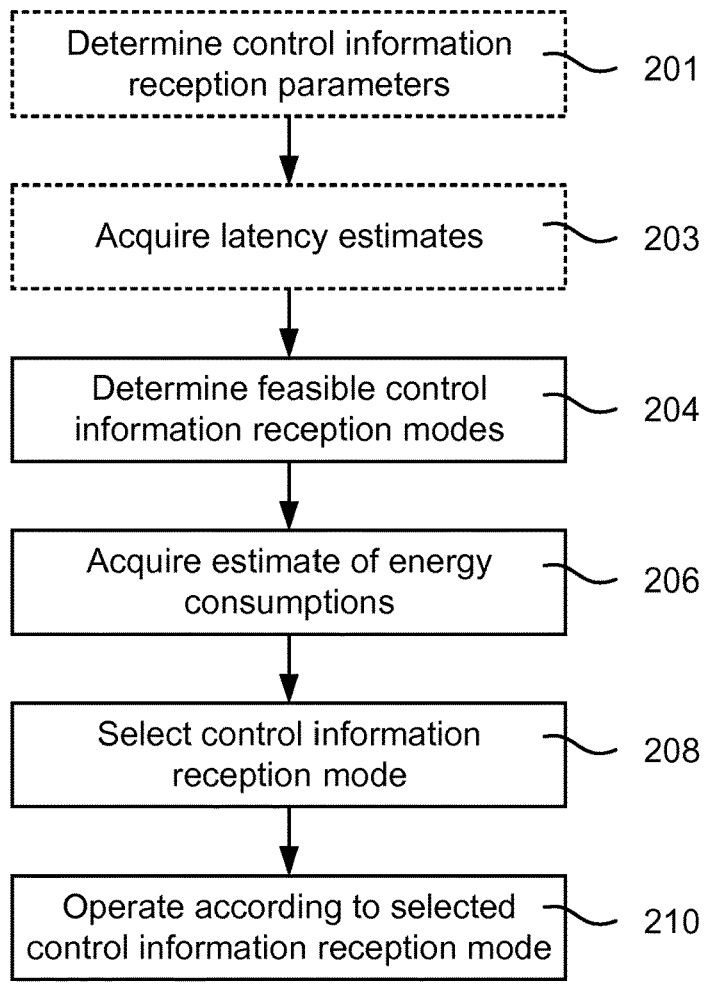
FIG. 2 is a flow chart illustrating a method according to embodiments.

FIG. 2 is a flow chart illustrating a method according to embodiments. There is disclosed a method at a wireless device to adapt physical receiver BW and/or operation mode parameters during a temporary low-BW signal monitoring phase such as of control information, e.g. PDCCH occasion monitoring. Thus, considering factors like the power consumption in one or more possible PDCCH reception modes, transient time durations and power consumption to move in, out of, and between the different modes, PDCCH-PSDCH scheduling configurations, in particular, the scheduling delay, i.e. K0 value, that are possible according to the current PDCCH search space, average PDSCH scheduling fraction, etc., the UE may select a suitable PDCCH reception mode to conserve energy in the PDCCH monitoring process.

The terms "low-power" and "low-BW" modes may be used interchangeable in the following discussion.

The wireless communication device, e.g. the UE, determines 204 feasible control information reception modes. This may be based on determination 201 of parameters describing the PDCCH/PDSCH monitoring configuration. PDCCH monitoring BW is determined by the PDCCH search space, e.g. in the NR the control resource element set, CORESET, and the maximal potential scheduled PDSCH BW may be inferred from BWP configurations given to the UE and the downlink control information, DCI, formats to check for. The length and monitoring occasion frequency of PDCCH is also provided in the search space.

If not already known by the wireless communication device, control information reception parameters may be determined 204. These parameters and the parameters of available control information reception modes are matched to determine 204 the feasible control information reception modes. The wireless communication device has thus formed a set of candidate control information reception modes. For this set of candidate control information reception modes, energy consumption estimates, considering a current or forecasted, e.g. from known scheduling, situation, are acquired 206 for the respective candidate control information reception modes. Here, the estimates may be acquired 206 by for example estimating the latency from historical data of the wireless communication device, calculating an estimate based on parameters of the respective control information reception mode, accessing a stored estimate e.g. from a look-up table, etc.

The procedure may include acquiring 203 latency estimates about transition delays between operation modes. The acquisition may for example include estimating the latency from historical data of the wireless communication device, calculating an estimate based on parameters of the respective control information reception mode, accessing a stored estimate, e.g. from a look-up table, etc. The estimated latencies may be used both for determining the feasible candidate control information reception modes and for acquiring the estimates on energy consumptions.

As discussed above, one or more parameters are analysed. The parameters may comprises one or more of bandwidth of current control information reception mode, expected required bandwidth of feasible data information reception modes, duration of feasible data information reception modes, transition latency requirements from a current control or data information reception mode to feasible candidate control information reception modes, transition latency requirements from candidate control information reception modes to feasible data information reception modes, etc.

Based on the acquired estimates on energy consumptions for the respective candidate control information reception modes, a control information reception mode is selected 208 and the wireless communication device then operates 210 according to the selected control information reception mode until another mode is selected, e.g. an upcoming data information reception mode, or another control information reception mode is determined and selected according to the principles demonstrated above.

In short, the wireless communication device obtains parameters describing one or more available low-power operations. The parameters may include power consumption during PDCCH monitoring in a low-BW mode, power consumption during PDSCH reception, and transition between the different modes and associated power or energy consumption. For example, the power levels of the different power states in FIG. 1 and additionally the minimum durations of the transition stages may be obtained from design info about the wireless communication device, previous and online measurements or estimates, and the current power regime of the wireless communication device. A look-up table (LUT) containing possible operating power modes, BW, power consumption and transition duration can be generated/maintained from wireless communication device production test or online measurement by the wireless communication device. By continuously updating power estimates for the different parts in the power consumption model, the practical operation can be improved and further adapted to different and possibly changing operator settings.

The wireless communication device may combine the scenario info from acquired parameters, HW operation, and constraint information to estimate operation feasibility and total estimated energy consumption during some time interval when operating according to different operating modes, for illustrative examples see patterns A to C in FIG. 1. In one embodiment, the feasibility of a given operating mode is determined based on satisfying worst-case latency requirements at all steps according to limits thereof. Candidate operating modes satisfying the requirements are then evaluated in terms of their energy consumption during a predetermined time interval, e.g. one slot, by acquiring an estimate of accumulated power consumption over the different relevant operating states during the sequence of steps making up a given pattern. The wireless communication device then adopts the operating mode out of the ones fulfilling latency requirements that results in lowest or low enough, e.g. in view of a threshold or energy budget, energy consumption. In an alternative embodiment, the wireless communication device may select a mode that provides at least a predetermined fraction of power saving, e.g. 10%; if no such mode is available, the full-power mode may be maintained for PDCCH monitoring.

In one embodiment, the energy consumption is estimated for a no-PDSCH case, in another, for a scheduled PDSCH case, in yet another, for average of both, and for yet another, for a weighted sum of no-PDSCH and scheduled PDSCH cases, where the probability of occurrence of scheduled PDSCH is estimated from recent traffic or known transmission patterns. In the latter case, invoking a lower-power mode would occur if the energy savings are significant in the total PDCCH and PDSCH reception context, not only PDCCH reception.

When a suitable operation mode has been selected, the wireless communication device operates the receiver in the selected mode for PDCCH reception and transfers to full-power mode or other higher-power, higher-BW mode for PDSCH reception when the latter is scheduled. For some circumstances, the selected mode, according to the principles demonstrated above, and the mode for PDSCH reception may be the same mode, but for most cases, there are significant energy savings to be done by employing a dedicated and wisely selected, as demonstrated above, mode for the PDCCH reception and then switching to another mode for the PDSCH reception.

Above, it was indicated that RF HW operation may be operated to fit the BW of the control information transmission, or that RF HW operation may be operated at a wider BW but where ADC and baseband processing instead is adapted to fit the BW of the control information transmission, the latter here referenced as BP-sampling mode. The BP-sampling mode may be desirable since the ADC typically consumes a large fraction of the RF front-end power for a given reception bandwidth.

Figure 3:
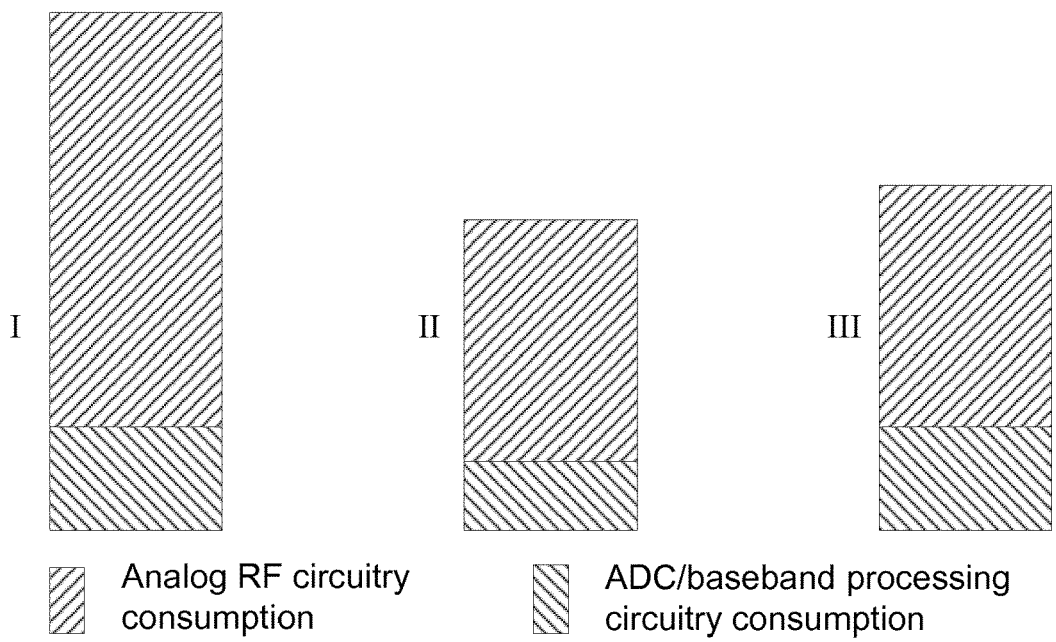
FIG. 3 schematically illustrates energy consumption distribution between analog radio frequency, RF, circuitry on one hand and analog-to-digital conversion, ADC, and/or baseband processing on the other hand for different control information reception modes I, II and III.

FIG. 3 schematically illustrates energy consumption distribution between analog radio frequency, RF, circuitry on one hand and analog-to-digital conversion, ADC, and/or baseband processing on the other hand for different control information reception modes I, II and III. Here, for the non-limiting examples given, mode I implies RF HW operation at a first BW and ADC and baseband processing operates at a sampling rate corresponding to the first RF BW. Mode TT implies RF HW operation at a second BW, narrower than the first BW, and ADC and baseband processing operates at a sampling rate corresponding to the second RF BW. Mode III implies RF HW operation at the first BW and ADC and baseband processing operates at a sampling rate corresponding to the second RF BW. The total power consumption of the RF block is highly dependent on the BW—for example if BW1=2·BW2 then RF power in mode I illustrated in FIG. 3, e.g. PDCCH monitoring in pattern A of FIG. 1, is nearly double the power in mode II illustrated in FIG. 3, e.g. PDCCH monitoring in pattern B of FIG. 1, where both analog RF circuit and ADC are reconfigured to achieve the lowest possible power consumption, but most of the power increase is due to the ADC contribution; the analog RF circuitry contributes only moderately in many applications.

However, regarding the transient time, pattern B as illustrated in FIG. 1 may need longer time to switch between a first BW and a second BW due to nature of analog RF reconfiguration. For example, to achieve lowest possible power consumption at the second BW, RF circuits may ramp down its supply voltage. This would prolong the transient time for the wireless communication device to switch to the first BW. Therefore, it may be attractive to operate an alternative receiver configuration, e.g. PDCCH monitoring in pattern C as illustrated in FIG. 1, by applying BP-sampling where ADC sampling rate can be lowered. That would lead to lower power consumption on both ADC and baseband processing. Though the RF power is not significantly reduced as in pattern B of FIG. 1 and mode II of FIG. 3, the transient time is dramatically reduced as reconfiguration of ADC sampling rate can be very quick, e.g. in microseconds, so that pattern C of FIG. 1 can be utilized at more monitoring occasions.

Figure 4:
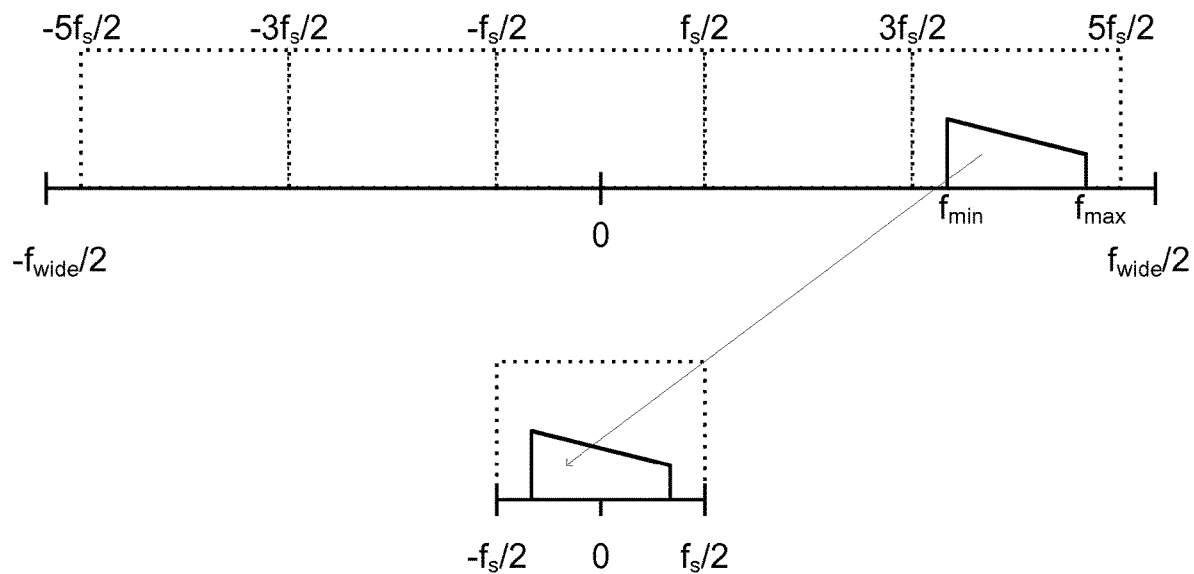
FIG. 4 a principle for bandpass sampling where folding effects are utilized.

FIG. 4 illustrates a principle for bandpass sampling where folding effects are utilized. The BP-sampling operation may follow principles briefly presented here: The BP-sampling approach utilizes the aliasing phenomenon that if a signal sampled at the rate $f_s$ has frequency components $f > f_s/2$, i.e. the sampling is performed in violation of the classical Nyquist criterion $f_s > 2f_{max}$ for a baseband signal centred at $f=0$, then those components are folded back into the baseband representation of the signal in the range $-f_s/2 \ldots +f_s/2$ with folding points $f/2 \pm n \cdot f_s$. FIG. 4 depicts in its upper graph a situation where an OFDM carrier with bandwidth $f_{wide}$, containing a narrow-band signal component with BW $F = f_{max} - f_{min}$, is sampled using a low sampling rate $f_s$, resulting in an alias image in a slowly-sampled signal representation, with a width of $f_s$, as illustrated in the lower graph.

Note that the illustration of FIG. 4 involves only two folding steps for simplicity of illustration, while a large number of folding points may be encountered in practical embodiments if $f_{max} \gg f_s$. Note that, in FIG. 4, the rest of the OFDM carrier is empty. If additional signals are present, those are also folded into the slowly-sampled signal of width $f_s$.

In one embodiment, the sampling rate $f_s$ should be chosen at least equal to or higher than the BW F, and so that the folding results in the narrow-BW signal being copied close to f=0 without folding distortion, i.e. the range $f_{min} \ldots f_{max}$ does not contain any points $f_s/2 \pm n \cdot f_s$. Preferably, the sampling rate $f_s$ is also a multiple m of the subcarrier spacing $f_{sc}$ of the OFDM signal, $f_s = m \cdot f_{sc}$, which allows directly extracting the OFDM subcarriers. If it is not a multiple, the down-aliased signal narrow-BW, slowly-sampled signal may according to one embodiment be resampled to a suitable sample rate.

In one BP-sampling receiver embodiment, then, the wireless communication device performs the following steps for narrow-BW signal extraction from a received wider carrier signal:
1. Optionally, selectivity filtering may be applied to separate the current active BW, e.g. the active BWP.
2. Based on the location $f_{min} \ldots f_{max}$ and BW of the desired narrow-BW signal in the active BW, and optionally the subcarrier spacing $f_{sc}$, sampling rate $f_s$ is determined and the active-BW signal is sampled at that rate.
3. Optionally, if sampling rate $f_s$ is not a multiple of subcarrier spacing $f_{sc}$, the sampled signal is resampled to a rate $m \cdot f_{sc}$, where m is not less than the number of subcarriers in the narrow-BW signal
4. Length-m discrete Fourier transform, DFT, e.g. fast Fourier transform, FFT, is applied to the slowly sampled signal and the desired subcarriers are extracted for further processing. Some subcarriers in the lower and upper edges may not contain the desired signal if m exceeds the actual number of subcarriers in desired signal.

That is, in short, analog-to-digital conversion sampling rate is determined based on a bandwidth of a control information transmission and a baseband processing window adapted to a bandwidth of the control information transmissions is applied.

As understood from above, the BP-sampling mode is viable if the desired narrow-BW signal is the only or dominating signal content in the active RF BW. If additional significant signals are present in the RF BW, they will be aliased into the desired signal BW and will interfere with desired signal detection. Therefore, additional conditions or preliminary information about signal contents of the active RF sub-band are preferably satisfied in order to invoke the BP-sampling mode, e.g.:

The active RF BW is known to be "empty" except for the PDCCH to be monitored during the OFDM symbols matching the PDCCH occasion in the search space. More generally, the necessary condition is that the active BW not contain signals that interfere with the desired signal after bandpass sampling due to aliasing. In some embodiments, it is not required that the entire active RF BW to be empty (besides the desired signal) but it suffices that the RF BW be empty outside the desired frequency interval (i.e. the fundamental frequency period after passband filtering). That is, an active radio frequency bandwidth is known to be empty outside a frequency interval adjacent to the information transmission that corresponds to the fundamental frequency period.

Negative signal power offsets may be applied to other signals or the signals may be sparse in nature so that a low effective aliasing leakage power is ensured.

Known robust PDCCH formats are used by the NW that guarantees sufficient decoding margin even in the presence of aliasing.

If one or more of these conditions is satisfied, the BP-sampling mode, e.g. mode III as of FIG. 3, can be invoked in the receiver for PDCCH monitoring.

The wireless communication device may obtain information about those criteria e.g. via signalling from the NW. Such signalling to a wireless communication device and applying the transmission constraints may be specific to individual UEs, e.g. for those requiring extra power savings. Alternatively, the wireless communication device may detect these conditions from observing previous PDCCH transmissions and using past statistics to establish likely transmission patterns.

An additional possibility is that the wireless communication device uses interference cancellation techniques to limit aliasing interference, for instance successive interference cancellation, SIC, or joint detection, JD, can be used to remove certain other signal components in the slowly sampled signal representation. Despite the additional baseband processing, this may result in overall power savings since the RF block power and the ADC energy consumption contribution is reduced.

As mentioned above, one of the important conditions in order to invoke the low power mode is that the delay between changing from low to high power mode is less than the delay between the PDCCH and PDSCH determined by the K0 value. In general, the UE becomes aware of K0 value upon decoding the PDCCH content. This becomes particularly an issue when K0=0, and thus by the time that the UE becomes aware of it, it maybe late to change the low power mode to the high one. In one embodiment, a scenario where the NW configures the UE always with K0>0 is considered, and thus if the transient time from low to high power mode is at least equal to or larger than one slot, the UE can potentially always operate in the low power mode for PDCCH monitoring.

In another embodiment, the NW can configure the UE to move to the lower power mode if a PDCCH occasion turned out to be dummy with no downlink scheduling. The UE then works in the low power mode until a PDSCH grant is obtained, where the NW in this case uses K0>0 allowing the UE to activate the high-power mode for PDSCH. The UE then continues in the high-power mode and NW can potentially use k0=0 value to save time, and thereby UE power, until a PDCCH occasion turns out to be dummy and the UE thus can move to the low power mode again.

In another embodiment, the UE applies the lower BW mode at least for PDCCH irrespective of the knowledge of the K0 or Start and Length Indicator Value (SLIV), that is, distance between the scheduling PDCCH and PDSCH/PUSCH in the same slot, in case it turns out that the transient time is higher than the scheduling delay, the UE can send a NACK in the next HARQ ACK/NACK occasion, and move to the higher BW mode from the next PDCCH Monitoring Occasion (MO). In a related realization, the UE performs as such if the historical data, a learning mechanism, or statistical characteristics depicts a sufficient delay between scheduling PDCCH and any of PDSCH or PUSCH.

The methods described in this IvD for flexible Rx BW switching can be readily applied to the case of flexible transmit BW switching in a UE, i.e. for transmission of PUCCH or PUSCH. E.g., the NW may schedule the UE with a PUCCH transmission (a HARQ ACK/NACK, a CSI report), or the UE has simply sent a Scheduling Request (SR) to the NW. In this case the PUCCH transmission may include certain T/F resource assignment allowing a potential BW switching. E.g., the PUCCH transmission may have a lower total frequency span than the active UL BWP. In this case, for the UE to decide to perform the BW switching, it needs to take the scheduling delay between the scheduling PDCCH and PUCCH or the scheduling delay between the PDSCH and PUCCH into account. E.g., the UE needs to make sure the PUCCH scheduling delay is lower than the transient time, or in case an additional PUSCH with a potential higher frequency span is scheduled before or after the PUCCH, there is sufficient time to perform the BW switching, i.e. either to or from the lower BW mode. In a more specific example, the UE may decide to operate in low power mode if the transient time is lower than the K1 value depicting the scheduling delay between the PDSCH and a HARQ ACK/NACK and further no PUSCH with a higher frequency span is located before or after the PUCCH. Similar examples can be applied to the case of PUSCH transmission. E.g., if the scheduling delay between a scheduling PDCCH and PUSCH (e.g. K2 value) is higher or equal to the transient time necessary for BW switching, the UE applies the Tx BW switching but if not, it does not.

Figure 5:
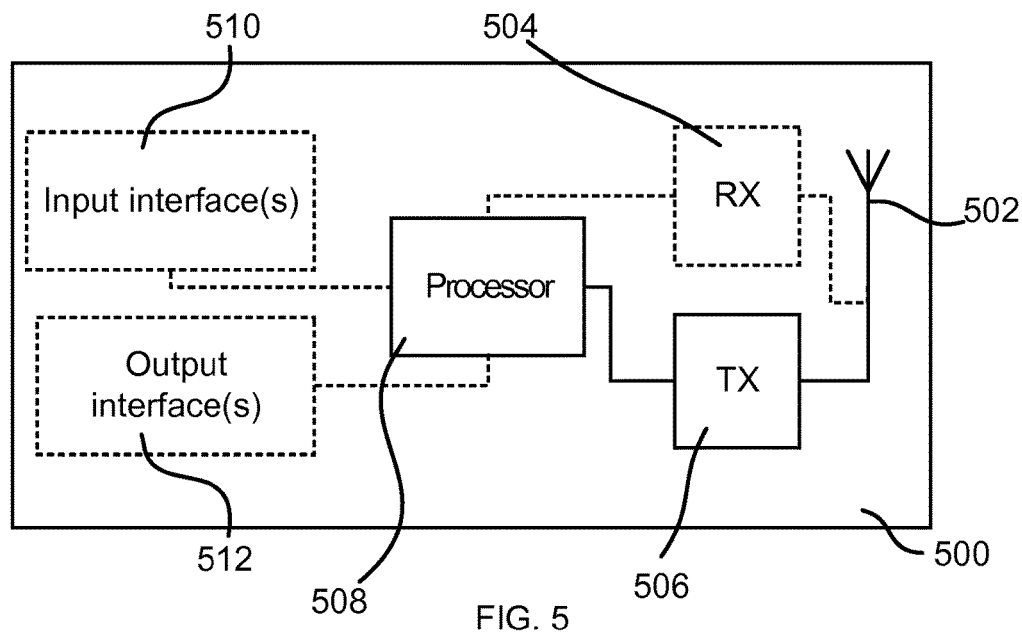
FIG. 5 is a block diagram schematically illustrating a wireless communication device according to an embodiment.

FIG. 5 is a block diagram schematically illustrating a wireless communication device 500, e.g. a UE, according to an embodiment. The wireless communication device 500 comprises an antenna arrangement 502, a receiver 504 connected to the antenna arrangement 502, a transmitter 506 connected to the antenna arrangement 502, a processing element 508 which may comprise one or more circuits, one or more input interfaces 510 and one or more output interfaces 512. The interfaces 510, 512 can be user interfaces and/or signal interfaces, e.g. electrical or optical. The wireless communication device 500 is arranged to operate in a cellular communication network employing a plurality of bandwidth alternatives for downlink control information. In particular, by the processing element 508 being arranged to perform the embodiments demonstrated with reference to FIGS. 1 to 4, the wireless communication device 500 is capable of selecting a control information reception mode which is suitable for the current circumstances and consumes a limited amount of energy. The processing element 508 can also fulfill a multitude of tasks, ranging from signal processing to enable reception and transmission since it is connected to the receiver 504 and transmitter 506, executing applications, controlling the interfaces 510, 512, etc.

Figure 6:
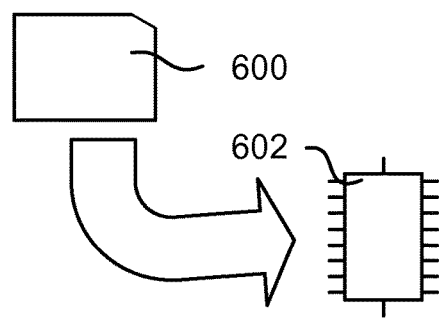
FIG. 6 schematically illustrates a computer-readable medium and a processing device.

The methods according to the present disclosure are suitable for implementation with aid of processing means, such as computers and/or processors, especially for the case where the processing element 508 demonstrated above comprises a processor handling evaluation and selection of a suitable control information reception mode for the current circumstances and which consumes a limited amount of energy. Therefore, there is provided computer programs, comprising instructions arranged to cause the processing means, processor, or computer to perform the steps of any of the methods according to any of the embodiments described with reference to FIG. 1 to 4. The computer programs preferably comprise program code which is stored on a computer readable medium 600, as illustrated in FIG. 6, which can be loaded and executed by a processing means, processor, or computer 602 to cause it to perform the methods, respectively, according to embodiments of the present disclosure, preferably as any of the embodiments described with reference to FIGS. 1 to 4. The computer 602 and computer program product 600 can be arranged to execute the program code sequentially where actions of the any of the methods are performed stepwise. The processing means, processor, or computer 602 is preferably what normally is referred to as an embedded system. Thus, the depicted computer readable medium 600 and computer 602 in FIG. 6 should be construed to be for illustrative purposes only to provide understanding of the principle, and not to be construed as any direct illustration of the elements.

The disclosed approach provides an improved mechanism for power savings of the UE receiver, thereby reducing overall energy consumption while considering scheduling delay constraints for the data traffic.

At least some embodiments of the disclosed approach provide a framework for effective lower-BW operation in some situations without RF reconfiguration, only instantaneous sampling-rate adaptation that carries a small energy cost and a minimal latency cost. In some scenarios, this mode with its negligible BW-change transition time enables PDCCH-related power reduction and results in lower energy consumption in some scenarios than the low-BW RF operation option.

The disclosure may be summarized by the following items:

1. A method of a wireless communication device, the communication device being arranged to operate in a wireless communication system employing a plurality of bandwidth alternatives for downlink control information, the method comprising determining feasible control information reception modes;

acquiring an estimate of energy consumption for respective feasible control information reception modes;

selecting control information reception mode based on the estimated energy consumption; and operating the wireless communication device with the selected control information reception mode.

2. The method of item 1, comprising determining control information reception parameters among a set of candidate control information reception mode parameters, which parameters comprises one or more of bandwidth of current control information reception mode;

expected required bandwidth of feasible data information reception modes;

duration of feasible data information reception modes;

transition latency requirements from a current control or data information reception mode to feasible candidate control information reception modes;

actual transition latencies associated with transition from candidate control information reception modes to feasible data information reception modes; and transition latency requirements from candidate control information reception modes to feasible data information reception modes.

3. The method of item 1 or 2, comprising acquiring a latency requirement estimate for a transition from a current control or data information reception mode to respective candidate control information reception modes, wherein the selecting of control information reception mode is further based on the latency requirement estimate for the transition from the current control or data information reception mode to the respective candidate control information reception modes.

4. The method of item 3, wherein the acquiring of the latency requirement estimate for the transition from the current control or data information reception mode to the respective candidate control information reception modes comprises any of estimating the latency from historical data of the wireless communication device;

calculating an estimate based on parameters of the respective control information reception mode; and accessing a stored estimate.

5. The method of any one of items 1 to 4, comprising acquiring latency requirement estimates for a transition from each candidate control information reception modes to a scheduled data information reception mode, wherein the selecting of control information reception mode is further based on the latency requirement estimates for the transition from each candidate control information reception modes to the scheduled data information reception mode.

6. The method of item 5, wherein the acquiring of the latency requirement estimates for the transition from each candidate control information reception modes to a scheduled data information reception mode comprises any of estimating the latency from historical data of the wireless communication device;

calculating an estimate based on parameters of the respective control information reception mode; and accessing a stored estimate.

7. The method of any one of items 3 to 6, wherein the determining of feasible control information reception modes takes the latency estimates for each candidate mode into account.

8. The method of any of the preceding items, wherein the acquiring of the estimate of energy consumption for respective control information reception mode comprises any of estimating the energy consumption from historical data of the wireless communication device;

calculating an estimate based on parameters of the respective control information reception mode; and accessing a stored estimate.

9. The method of item 8, wherein the calculating of the estimate based on parameters of the respective control information reception mode comprises an aggregate of one or more of calculating analog radio frequency circuitry energy consumption for applied bandwidth;

calculating analog-to-digital conversion circuitry energy consumption for applied conversion rate;

calculating energy consumption for switching of bandwidth of analog radio frequency circuitry;

calculating baseband processing energy consumption for the control information reception mode.

10. The method of any of the preceding items, wherein the feasible control information reception modes comprise the current control information reception mode.

11. The method of any one of the preceding items, wherein at least one of the feasible control information reception modes comprises operating analog receiver radio circuitry at a reduced bandwidth compared with data information reception modes to fit control information transmissions.

12. The method of any one of items 1 to 10, wherein at least one of the feasible control information reception modes comprises operating analog receiver radio circuitry at a bandwidth wider than to fit control information transmissions but where analog-to-digital conversion is performed at a lower rate than corresponding to the bandwidth on which the analog radio receiver circuitry is operated.

13. The method of item 12, wherein the control information reception mode which comprises operating analog receiver radio circuitry at a bandwidth wider than to fit control information transmissions but where analog-to-digital conversion is performed at a lower rate than corresponding to the bandwidth on which the analog radio receiver circuitry is operated comprises determining analog-to-digital conversion sampling rate based on a bandwidth of a control information transmission; and applying a baseband processing window adapted to a bandwidth of the control information transmissions.

14. The method of item 13, comprising selecting the analog-to-digital conversion sampling rate $f_s$ to be chosen at least equal to or higher than the bandwidth of the control information transmission so that a folding results in the control information transmission signal being copied close to zero frequency f=0 with low folding distortion.

15. The method of item 13 or 14, wherein the analog-to-digital conversion sampling rate $f_s$ is a multiple m of a subcarrier spacing $f_{sc}$ of an orthogonal frequency division multiplex, OFDM, signal of the control information transmission signal, $f_s = m \cdot f_{sc}$.

16. The method of item 13 or 14, wherein the resulting signal of the folding is resampled to allow direct extraction of orthogonal frequency division multiplex, OFDM, subcarriers carrying the control information transmission signal.

17. The method of any one of the preceding items, comprising receiving signalling indicating bandwidth of control information transmission; and that active radio frequency bandwidth is known to be empty outside the bandwidth of the control information transmission.

18. The method of any one of items 1 to 16, comprising estimating bandwidth of information transmission; and whether active radio frequency bandwidth is empty outside the bandwidth of the information transmission.

19. A wireless communication device being arranged to operate in a wireless communication system employing a plurality of bandwidth alternatives for downlink control information, the wireless communication device comprising transceiver and processing circuitry configured to determine feasible control information reception modes;

acquire an estimate of energy consumption for respective feasible control information reception modes;

select control information reception mode based on the estimated energy consumption; and operate the wireless communication device with the selected control information reception mode.

20. The wireless communication device of item 19, wherein the circuitry is configured to determine control information reception parameters among a set of candidate control information reception mode parameters, which parameters comprises one or more of bandwidth of current control information reception mode;

expected required bandwidth of feasible control information reception modes;

duration of feasible data information reception modes;

actual transition latencies associated with transition from a current control or data information reception mode to feasible candidate control information reception modes; and transition latency requirements from candidate control information reception modes to feasible data information reception modes.

21. The wireless communication device of item 19 or 20, wherein the circuitry is configured to acquire a latency requirement estimate for a transition from a current control or data information reception mode to respective candidate control information reception modes, wherein the selection of control information reception mode is further based on the latency requirement estimate for the transition from the current control or data information reception mode to the respective candidate control information reception modes.

22. The wireless communication device of item 20, wherein the acquisition of the latency requirement estimate for the transition from the current control or data information reception mode to the respective candidate control information reception modes comprises any of the circuitry being arranged
to estimate the latency from historical data of the wireless communication device;
to calculate an estimate based on parameters of the respective control information reception mode; and
to access a stored estimate.

23. The wireless communication device of any one of items 19 to 22, wherein the circuitry is arranged to acquire latency requirement estimates for a transition from each candidate control information reception modes to a scheduled data information reception mode, wherein the selection of control information reception mode is further based on the latency requirement estimates for the transition from each candidate control information reception modes to the scheduled data information reception mode.

24. The wireless communication device of item 23, wherein the acquisition of the latency requirement estimates for the transition from each candidate control information reception modes to a scheduled data information reception mode is performed by the circuitry is arranged to
estimate the latency from historical data of the wireless communication device;
calculate an estimate based on parameters of the respective control information reception mode;
access a stored estimate, or
any combination thereof.

25. The wireless communication device of any one of items 21 to 24, wherein the determination of feasible control information reception modes takes the latency estimates for each candidate mode into account.

26. The wireless communication device of any of items 19 to 25, wherein the acquired estimate of energy consumption for respective control information reception mode comprises any of
an estimate of the energy consumption from historical data of the wireless communication device;
a calculation of an estimate based on parameters of the respective control information reception mode; and
a stored estimate.

27. The wireless communication device of item 26, wherein the calculation of the estimate based on parameters of the respective control information reception mode comprises an aggregate of one or more of
a calculation of analog radio frequency circuitry energy consumption for applied bandwidth;
a calculation of analog-to-digital conversion circuitry energy consumption for applied conversion rate;
a calculation of energy consumption for switching of bandwidth of analog radio frequency circuitry;
a calculation of baseband processing energy consumption for the control information reception mode.

28. The wireless communication device of any of items 19 to 27, wherein the feasible control information reception modes comprise the current control information reception mode.

29. The wireless communication device of any one of items 19 to 28, wherein at least one of the feasible control information reception modes includes to operate analog receiver radio circuitry at a reduced bandwidth compared with data information reception modes to fit control information transmissions.

30. The wireless communication device of any one of items 19 to 28, wherein at least one of the feasible control information reception modes includes to operate analog receiver radio circuitry at a bandwidth wider than to fit control information transmissions but where analog-to-digital conversion is performed at a lower rate than corresponding to the bandwidth on which the analog radio receiver circuitry is operated.

31. The wireless communication device of item 30, wherein the control information reception mode which includes to operate analog receiver radio circuitry at a bandwidth wider than to fit control information transmissions but where analog-to-digital conversion is performed at a lower rate than corresponding to the bandwidth on which the analog radio receiver circuitry is operated includes to
determine analog-to-digital conversion sampling rate based on a bandwidth of a control information transmission; and
apply a baseband processing window adapted to a bandwidth of the control information transmissions.

32. The wireless communication device of item 31, arranged to select the analog-to-digital conversion sampling rate $f_s$ to be chosen at least equal to or higher than the bandwidth of the control information transmission so that a folding results in the control information transmission signal being copied close to zero frequency f=0 with low folding distortion.

33. The wireless communication device of item 31 or 32, wherein the analog-to-digital conversion sampling rate $f_s$ is a multiple m of a subcarrier spacing $f_{sc}$ of an orthogonal frequency division multiplex, OFDM, signal of the control information transmission signal, $f_s = m \cdot f_{sc}$.

34. The wireless communication device of item 31 or 32, wherein the resulting signal of the folding is resampled to allow direct extraction of orthogonal frequency division multiplex, OFDM, subcarriers carrying the control information transmission signal.

35. The wireless communication device of any one of items 19 to 34, wherein the circuitry is arranged to receive signalling indicating
bandwidth of control information transmission; and
that active radio frequency bandwidth is known to be empty outside the bandwidth of the control information transmission.

36. The wireless communication device of any one of items 19 to 34, wherein the circuitry is arranged to estimate
bandwidth of control information transmission; and
whether active radio frequency bandwidth is empty outside the bandwidth of the control information transmission.

37. A computer program comprising instructions which, when executed on a processor of a wireless communication device, causes the wireless communication device to perform the method according to any of items 1 to 18.

The invention claimed is:

1. A method for a wireless communication device, the wireless communication device being arranged to operate in a wireless communication system employing a plurality of bandwidth alternatives for information transmissions, the method comprising:
determining, by the wireless communication device, feasible information transmission modes, the feasible information transmission modes being associated with adaptive operating bandwidths available at the wireless device, and each feasible information transmission mode including a mode during which the wireless communication device receives downlink information or a mode during which the wireless device transmits uplink information;

acquiring, by the wireless communication device, an estimate of energy consumption for each respective feasible information transmission mode, the acquiring, by the wireless communication device, the estimate of energy consumption for each respective feasible information transmission mode including calculating the estimate of energy consumption based on parameters of the respective feasible information transmission mode, the calculating the estimate of energy consumption based on the parameters of the respective feasible information transmission mode including an aggregate of two or more of:

calculating analog radio frequency circuitry energy consumption for an applied bandwidth;

calculating analog-to-digital conversion circuitry energy consumption for an applied conversion rate;

calculating energy consumption for switching of a bandwidth of analog radio frequency circuitry; and calculating baseband processing energy consumption for a control information reception mode;

selecting, by the wireless communication device, one information transmission mode out of the feasible information transmission modes based on the estimated energy consumption; and operating the wireless communication device with the one information transmission mode selected by the wireless communication device.

2. The method of claim 1, wherein the feasible information transmission mode comprises the mode during which the wireless communication device receives the downlink information.

3. The method of claim 1, wherein the feasible information transmission mode comprises the mode during which the wireless device transmits the uplink information.

4. The method of claim 1, wherein the information comprises control information.

5. The method of claim 1, wherein the information comprises scheduled data.

6. The method of claim 1, further comprising determining information transmission parameters among a set of candidate information transmission mode parameters, the set of candidate transmission parameters including one or more of:

a bandwidth of a current control information transmission mode;

expected required bandwidth of feasible data information transmission modes;

duration of the feasible data information transmission modes;

transition latency requirements from the current control information transmission mode or a data information transmission mode to feasible candidate information transmission modes;

actual transition latencies associated with a transition from the feasible candidate information transmission modes to feasible scheduled data information transmission modes; and transition latency requirements from the feasible candidate information transmission modes to the feasible scheduled data information transmission modes.

7. The method of claim 1, further comprising acquiring a latency requirement estimate for a transition from a current information transmission mode or a scheduled data information transmission mode to respective candidate information transmission modes, wherein selecting, by the wireless communication device, the one information transmission mode is further based on the latency requirement estimate for the transition from the current information transmission mode or the scheduled data information transmission mode to the respective candidate information transmission modes.

8. The method of claim 7, wherein acquiring the latency requirement estimate for the transition from the current information transmission mode or the scheduled data information transmission mode to the respective candidate information transmission modes comprises any of:

estimating the latency requirement from historical data of the wireless communication device;

calculating the latency requirement estimate based on parameters of the respective candidate information transmission mode; and accessing a stored estimate.

9. The method of claim 1, further comprising acquiring a respective latency requirement estimate for a transition from each of candidate information transmission modes to a scheduled data information transmission mode, wherein selecting, by the wireless communication device, of the one information transmission mode is further based on the respective latency requirement estimate for the transition from each candidate information transmission mode to the scheduled data information transmission mode.

10. The method of claim 9, wherein acquiring the respective latency requirement estimate for the transition from each of the candidate information transmission modes to the scheduled data information transmission mode comprises any of:

estimating the latency requirement from historical data of the wireless communication device;

calculating the latency requirement estimate based on parameters of the respective candidate information transmission mode; and accessing a stored estimate.

11. The method of claim 9, wherein determining, by the wireless communication device, the feasible information transmission modes takes the latency requirement estimate for each candidate information transmission mode into account.

12. The method of claim 1, wherein acquiring, by the wireless communication device, the estimate of energy consumption for each respective information transmission mode further comprises any of:

estimating the energy consumption from historical data of the wireless communication device; and accessing a stored estimate of energy consumption.

13. The method of claim 1, wherein the feasible information transmission modes comprise a current information transmission mode.

14. The method of claim 1, wherein at least one of the feasible information transmission modes comprises a mode of operating an analog receiver radio circuitry at a reduced bandwidth compared with a bandwidth of scheduled data information transmission modes to fit the information transmissions.

15. The method of claim 1, wherein at least one of the feasible information transmission modes comprises a mode of operating an analog receiver radio circuitry at a bandwidth wider than to fit the information transmissions but where an analog-to-digital conversion is performed at a lower sampling rate than that corresponding to the bandwidth on which the analog radio receiver circuitry is operated.

16. The method of claim 15, wherein the information transmission mode that comprises the mode of operating the analog receiver radio circuitry at the wider bandwidth but where the analog-to-digital conversion is performed at the lower sampling rate than that corresponding to the bandwidth on which the analog radio receiver circuitry is operated comprises:
determining an analog-to-digital conversion sampling rate based on a bandwidth of an information transmission; and
applying a baseband processing window adapted to a bandwidth of the information transmissions.

17. The method of claim 16, comprising:
selecting the analog-to-digital conversion sampling rate fs to be at least equal to or higher than the bandwidth of the information transmission so that a folding results in an information transmission signal being copied relatively close to zero frequency f=0 with low folding distortion.

18. The method of claim 17, wherein the information transmission signal resulting from the folding is resampled to allow a direct extraction of orthogonal frequency division multiplex, OFDM, subcarriers carrying the information transmission signal.

19. The method of claim 16, wherein the analog-to-digital conversion sampling rate $f_s$ is a multiple m of a subcarrier spacing $f_{sc}$ of an orthogonal frequency division multiplex, OFDM, signal of the information transmission signal, where $f_s = m \cdot f_{sc}$.

20. The method of claim 1, further comprising receiving signalling indicating (i) a bandwidth of an information transmission and (ii) that an active radio frequency bandwidth is known to be empty outside a frequency interval adjacent to the information transmission that corresponds to a fundamental frequency period.

21. The method of claim 1, further comprising estimating (i) a bandwidth of an information transmission and (ii) whether an active radio frequency bandwidth is empty outside a frequency interval adjacent to the information transmission that corresponds to a fundamental frequency period.

22. A wireless communication device configured to operate in a wireless communication system employing a plurality of bandwidth alternatives for information transmissions, the wireless communication device comprising a transceiver and a processing circuitry configured to:
cause the wireless communication device to:
determine feasible information transmission modes, the feasible information transmission modes being associated with adaptive operating bandwidths available at the wireless device, and each feasible information transmission mode including a mode during which the wireless communication device receives downlink information or a mode during which the wireless device transmits uplink information;
acquire an estimate of energy consumption for each respective feasible information transmission mode, the acquiring the estimate of energy consumption for each respective feasible information transmission mode including calculating the estimate of energy consumption based on parameters of the respective feasible information transmission mode, the calculating the estimate of energy consumption based on the parameters of the respective feasible information transmission mode including an aggregate of two or more of:
calculating analog radio frequency circuitry energy consumption for an applied bandwidth;
calculating analog-to-digital conversion circuitry energy consumption for an applied conversion rate;
calculating energy consumption for switching of a bandwidth of analog radio frequency circuitry; and
calculating baseband processing energy consumption for a control information reception mode;
select one information transmission mode out of the feasible information transmission modes based on the estimated energy consumption; and
operate with the one selected information transmission mode.

23. The wireless communication device of claim 22, wherein the processing circuitry being configured to operate the wireless communication device with the selected information transmission mode comprises the processing circuitry being arranged to receive the downlink information by the wireless communication device.

24. The wireless communication device of claim 22, wherein the processing circuitry being configured to operate the wireless communication device with the selected information transmission mode comprises being configured to transmit the uplink information by the wireless communication device.

25. The wireless communication device of claim 22, wherein the information comprises control information.

26. The wireless communication device of claim 22, wherein the information comprises scheduled data.

27. The wireless communication device of claim 22, wherein the processing circuitry is further configured to acquire a latency requirement estimate for a transition from a current information transmission mode or a scheduled data information transmission mode to respective candidate information transmission modes, wherein the selection of the one information transmission mode is further based on the latency requirement estimate for the transition from the current information transmission mode or the scheduled data information transmission mode to the respective candidate information transmission modes.

28. The wireless communication device of claim 27, wherein the acquisition of the latency requirement estimate for the transition from the current information transmission mode or the scheduled data information transmission mode to the respective candidate information transmission modes comprises the processing circuitry being configured to perform any of the following:
estimating the latency requirement from historical data of the wireless communication device;
calculating the latency requirement estimate based on parameters of the respective information transmission mode; and
accessing a stored estimate.

29. The wireless communication device of claim 27, wherein to determine the feasible information transmission modes, the processing circuitry is configured to take the latency requirement estimates for each candidate information transmission mode into account.

30. The wireless communication device of claim 22, wherein the processing circuitry is further arranged to acquire a respective latency requirement estimate for a transition from each of candidate information transmission modes to a scheduled data information reception mode, wherein the selection of information transmission mode is further based on the respective latency requirement estimate for the transition from each candidate information transmission modes to the scheduled data information transmission mode.

31. The wireless communication device of claim 30, wherein the processing circuitry is further configured to:
   estimate the latency requirement from historical data of the wireless communication device;
   calculate the latency requirement estimate based on parameters of the respective candidate information transmission mode;
   access a stored estimate; or
   any combination thereof.

32. The wireless communication device of claim 22, wherein the acquired estimate of energy consumption for each respective information reception mode comprises any of:
   an estimate of the energy consumption from historical data of the wireless communication device;
   a calculation of an estimate of energy consumption based on parameters of the respective information transmission mode; and
   a stored estimate.

33. A non-transitory computer storage medium storing a computer program comprising instructions that, when executed by a processor of a wireless communication device, causes the wireless communication device to perform a method for the wireless communication device, the wireless communication device being arranged to operate in a wireless communication system employing a plurality of bandwidth alternatives for information transmissions, the method comprising:
   determining, by the wireless communication device, feasible information transmission modes, the feasible information transmission modes being associated with adaptive operating bandwidths available at the wireless device, and each feasible information transmission mode including a mode during which the wireless communication device receives downlink information or a mode during which the wireless device transmits uplink information;
   acquiring, by the wireless communication device, an estimate of energy consumption for each respective feasible information transmission mode;
   the acquiring the estimate of energy consumption for each respective feasible information transmission mode including calculating the estimate of energy consumption based on parameters of the respective feasible information transmission mode, the calculating the estimate of energy consumption based on the parameters of the respective feasible information transmission mode including an aggregate of two or more of:
      calculating analog radio frequency circuitry energy consumption for an applied bandwidth;
      calculating analog-to-digital conversion circuitry energy consumption for an applied conversion rate;
      calculating energy consumption for switching of a bandwidth of analog radio frequency circuitry; and
      calculating baseband processing energy consumption for a control information reception mode;
   selecting, by the wireless communication device, one information transmission mode out of the feasible information transmission modes based on the estimated energy consumption; and
   operating the wireless communication device with the one information transmission mode selected by the wireless communication device.

\* \* \* \* \*